(12) United States Patent
Dugast et al.

(10) Patent No.: US 12,443,537 B2
(45) Date of Patent: Oct. 14, 2025

(54) METHOD TO MINIMIZE HOT/COLD PAGE DETECTION OVERHEAD ON RUNNING WORKLOADS

(71) Applicant: Intel Corporation, Santa Clara, CA (US)

(72) Inventors: Francois Dugast, Karlsruhe (DE); Durgesh Srivastava, Cupertino, CA (US); Sujoy Sen, Beaverton, OR (US); Lidia Warnes, Roseville, CA (US); Thomas E. Willis, Redwood City, CA (US); Bassam N. Coury, Portland, OR (US)

(73) Assignee: Intel Corporation, Santa Clara, CA (US)

(*) Notice: Subject to any disclaimer, the term of this patent is extended or adjusted under 35 U.S.C. 154(b) by 875 days.

(21) Appl. No.: 17/483,195

(22) Filed: Sep. 23, 2021

(65) Prior Publication Data

US 2023/0092541 A1 Mar. 23, 2023

(51) Int. Cl.
*G06F 12/0811* (2016.01)
*G06F 12/0882* (2016.01)
(Continued)

(52) U.S. Cl.
CPC ...... *G06F 12/0882* (2013.01); *G06F 12/0811* (2013.01); *G06F 12/123* (2013.01);
(Continued)

(58) Field of Classification Search
CPC ............. G06F 12/0882; G06F 12/0811; G06F 12/123; G06F 13/1668; G06F 13/4208;
(Continued)

(56) References Cited

U.S. PATENT DOCUMENTS

| 11,467,960 | B1 * | 10/2022 | Dimond | G06F 11/3037 |
| 2008/0301816 | A1 * | 12/2008 | Ting | G06F 21/41 726/26 |

(Continued)

FOREIGN PATENT DOCUMENTS

| EP | 0769745 A1 * | 4/1997 | ........... G06F 13/102 |
| EP | 3118745 A1 * | 1/2017 | ......... G06F 12/0246 |
| WO | WO-2015101951 A1 * | 7/2015 | ......... G06F 12/0815 |

*Primary Examiner* — Kenneth M Lo
*Assistant Examiner* — Hewy H Li
(74) *Attorney, Agent, or Firm* — Compass IP Law PC

(57) ABSTRACT

Methods and apparatus to minimize hot/cold page detection overhead on running workloads. A page meta data structure is populated with meta data associated with memory pages in one or more far memory tier. In conjunction with one or more processes accessing memory pages to perform workloads, the page meta data structure is updated to reflect accesses to the memory pages. The page meta data is used to determine which pages are "hot" pages and which pages are "cold" pages, wherein hot pages are memory pages with relatively higher access frequencies and cold pages are memory pages with relatively lower access frequencies. Variations on the approach including filtering meta data updates on pages in memory regions of interest and applying a filter(s) to trigger meta data updates based on (a) condition(s). A callback function may also be triggered to be executed synchronously with memory page accesses.

20 Claims, 12 Drawing Sheets

(51) Int. Cl.
*G06F 12/123* (2016.01)
*G06F 13/16* (2006.01)
*G06F 13/42* (2006.01)
*G06F 15/78* (2006.01)
*G06F 12/1009* (2016.01)

(52) U.S. Cl.
CPC ...... *G06F 13/1668* (2013.01); *G06F 13/4208* (2013.01); *G06F 15/7807* (2013.01); *G06F 12/1009* (2013.01)

(58) Field of Classification Search
CPC ............... G06F 15/7807; G06F 9/5016; G06F 12/0835; G06F 12/08; G06F 2212/1024; G06F 12/0813; G06F 12/122; G06F 12/1009; G06F 12/0804; G06F 2212/7201; G06F 12/126; G06F 12/1072; G06F 2212/154; G06F 2212/163; G06F 2212/682; G06F 12/1027; G06F 12/0815; G06F 12/109; G06F 2212/502; G06F 2212/657
See application file for complete search history.

(56) References Cited

U.S. PATENT DOCUMENTS

| | | | |
|---|---|---|---|
| 2011/0161620 A1* | 6/2011 | Kaminski | G06F 12/1081 711/E12.001 |
| 2012/0117299 A1* | 5/2012 | Waldspurger | G06F 9/45558 711/E12.071 |
| 2012/0265963 A1* | 10/2012 | Agesen | G06F 12/1027 711/207 |
| 2017/0286672 A1* | 10/2017 | Sultana | G06F 21/56 |
| 2019/0370177 A1* | 12/2019 | Olderdissen | G06F 12/122 |
| 2021/0048958 A1* | 2/2021 | Guim Bernat | G06F 3/0604 |
| 2022/0100668 A1* | 3/2022 | Blagodurov | G06F 12/0815 |
| 2022/0179799 A1* | 6/2022 | Erickson | G06F 12/0882 |
| 2022/0391272 A1* | 12/2022 | Jose | G06F 9/546 |
| 2023/0031304 A1* | 2/2023 | Aguilera | G06F 9/5044 |
| 2024/0354216 A1* | 10/2024 | Evans | G06F 12/1027 |

* cited by examiner

METHOD TO MINIMIZE HOT/COLD PAGE DETECTION OVERHEAD ON RUNNING WORKLOADS

BACKGROUND INFORMATION

Resource disaggregation is becoming increasingly prevalent in emerging computing scenarios such as cloud (aka hyperscaler) usages, where disaggregation provides the means to manage resource effectively and have uniform landscapes for easier management. While storage disaggregation is widely seen in several deployments, for example, Amazon S3, compute and memory disaggregation is also becoming prevalent with hyperscalers like Google Cloud.

FIG. 1 illustrates the recent evolution of compute and storage disaggregation. As shown, under a Web scale/hyperconverged architecture 100, storage resources 102 and compute resources 104 are combined in the same chassis, drawer, sled, or tray, as depicted a chassis 106 in a rack 108. Under the rack scale disaggregation architecture 110, the storage and compute resources are disaggregated as pooled resources in the same rack. As shown, this includes compute resources 104 in multiple pooled compute drawers 112 and a pooled storage drawer 114 in a rack 116. In this example, pooled storage drawer 114 comprises a top of rack "just a bunch of flash" (JBOF). Under the complete disaggregation architecture 118 the compute resources in pooled compute drawers 112 and the storage resources in pooled storage drawers 114 are deployed in separate racks 120 and 122.

FIG. 2 shows an example of disaggregated architecture. Compute resources, such as multi-core processors (aka CPUs (central processing units)) in blade servers or server modules (not shown) in two compute bricks 202 and 204 in a first rack 206 are selectively coupled to memory resources (e.g., DRAM DIMMs, NVDIMMs, etc.) in memory bricks 208 and 210 in a second rack 212. Each of compute bricks 202 and 204 include an FPGA (Field Programmable Gate Array 214 and multiple ports 216. Similarly, each of memory bricks 208 and 210 include an FPGA 218 and multiple ports 220. The compute bricks also have one or more compute resources such as CPUs, or Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. Compute bricks 202 and 204 are connected to the memory bricks 208 via ports 216 and 220 and switch or interconnect 222, which represents any type of switch or interconnect structure. For example, under embodiments employing Ethernet fabrics, switch/interconnect 222 may be an Ethernet switch. Optical switches and/or fabrics may also be used, as well as various protocols, such as Ethernet, InfiniBand, RDMA (Remote Direct Memory Access), NVMe-oF (Non-volatile Memory Express over Fabric, RDMA over Converged Ethernet (RoCE), CXL (Compute Express Link) etc. FPGAs 214 and 218 are programmed to perform routing and forwarding operations in hardware. As an option, other circuitry such as CXL switches may be used with CXL fabrics.

Generally, a compute brick may have dozens or even hundreds of cores, while memory bricks, also referred to herein as pooled memory, may have terabytes (TB) or 10's of TB of memory implemented as disaggregated memory. An advantage is to carve out usage-specific portions of memory from a memory brick and assign it to a compute brick (and/or compute resources in the compute brick). The amount of local memory on the compute bricks is relatively small and generally limited to bare functionality for operating system (OS) boot and other such usages.

One of the challenges with disaggregated architectures is the overall increased latency to memory. Local memory within a node can be accessed within 100 ns (nanoseconds) or so, whereas the latency penalty for accessing disaggregated memory resources over a network or fabric is much higher.

In addition to disaggregated architecture, other memory architectures employ multiple tiers, sometimes referred to as "near" memory and "far" memory. As with disaggregated architectures, the latency to access far memory is substantially greater than the latency to access near memory.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
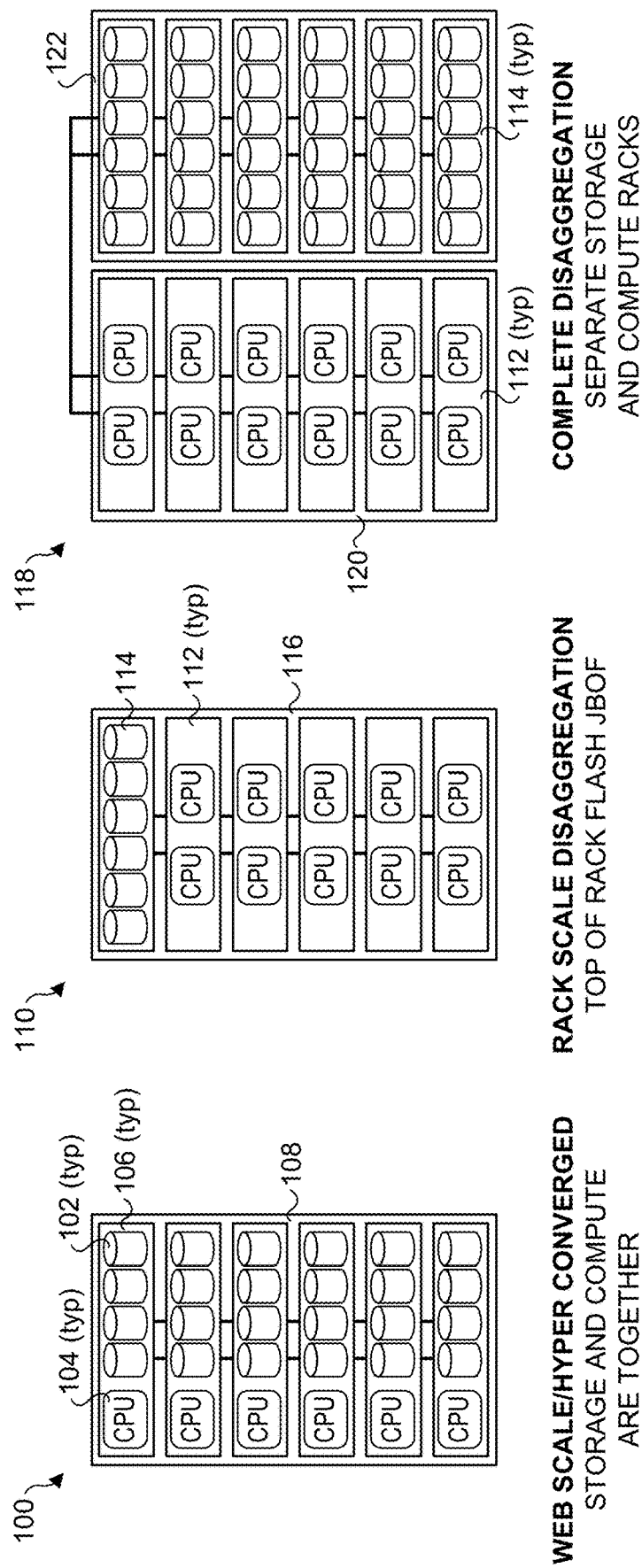
FIG. 1 is a diagram illustrating the recent evolution of compute and storage disaggregation.
Figure 2:
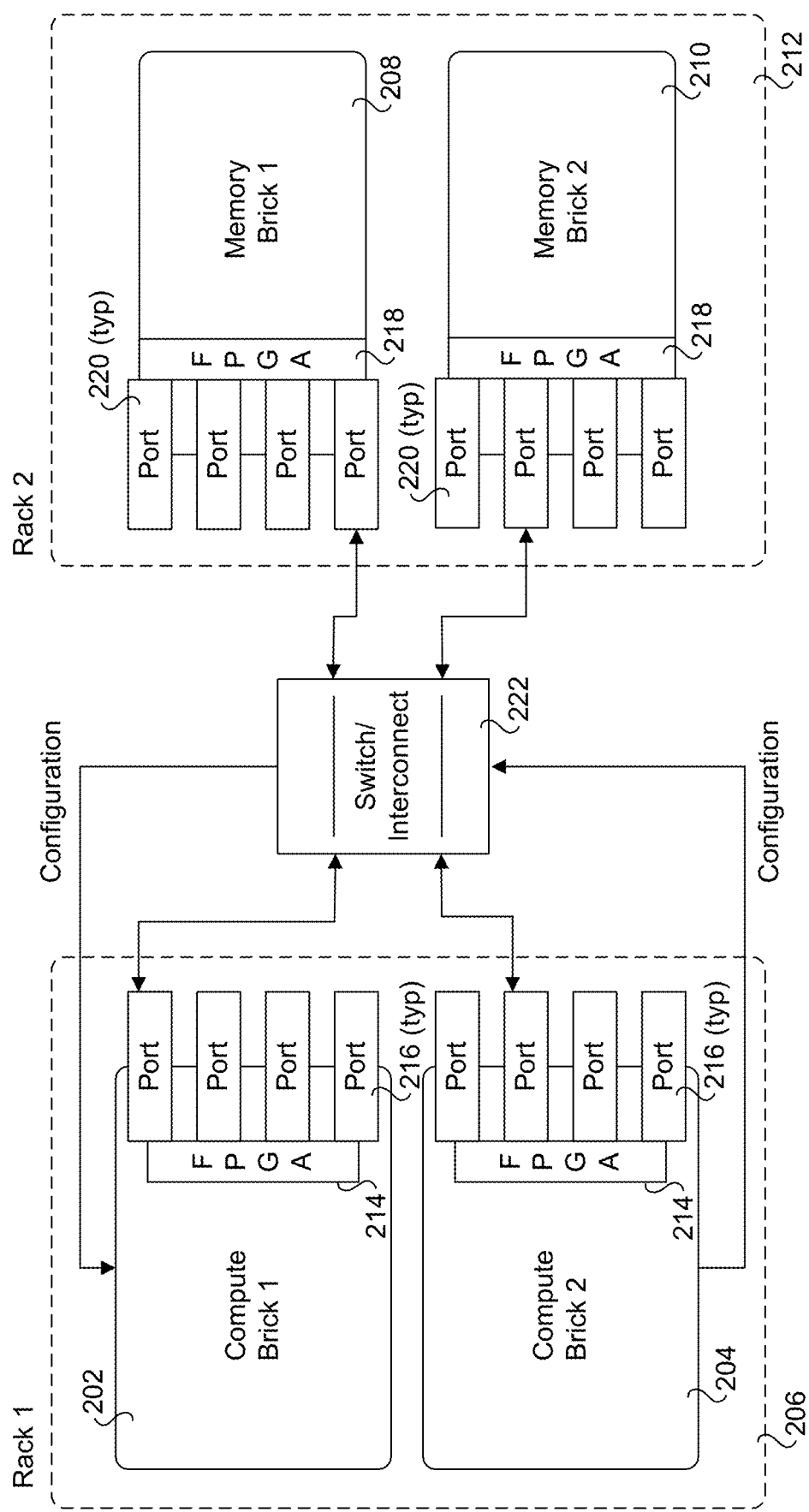
FIG. 2 is a diagram illustrating an example of disaggregated architecture.

Embodiments of methods and apparatus to minimize hot/cold page detection overhead on running workloads are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Application to Multi-tiered Memory Architectures

Figure 3:
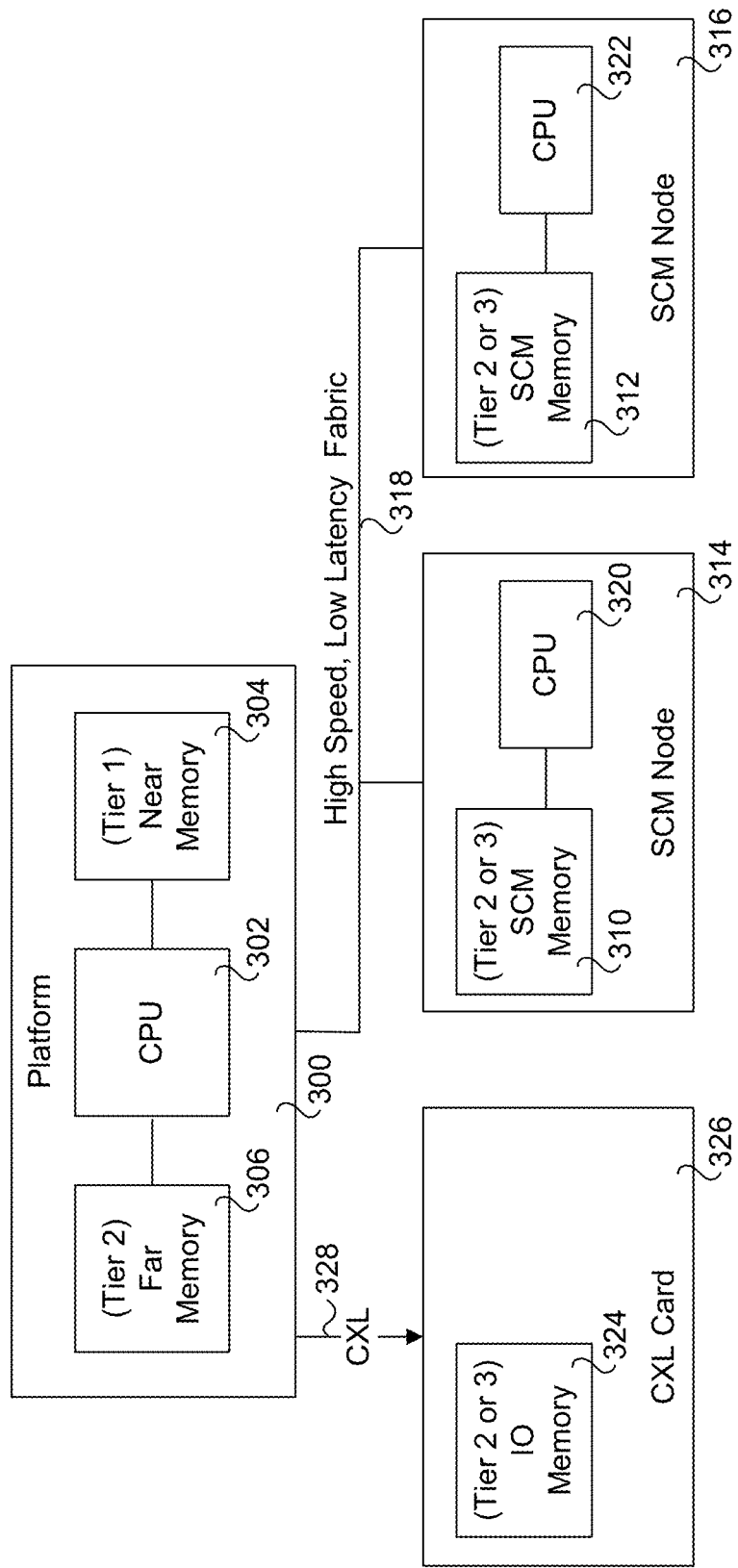
FIG. 3 is a diagram illustrating an abstract view of a tiered memory architecture employing three tiers.

The teachings and the principles described herein may be implemented using various types of tiered memory architectures. For example, FIG. 3 illustrates an abstract view of a tiered memory architecture employing three tiers: 1) "near" memory; 2) "far" memory; and 3) SCM (storage class memory). The terminology "near" and "far" memory do not refer to the physical distance between a CPU and the associated memory device, but rather the latency and/or bandwidth for accessing data stored in the memory device.

FIG. 3 shows a platform 300 including a central processing unit (CPU) 302 coupled to near memory 304 and far memory 306. Compute node 300 is further connected to SCM memory 310 and 312 in SCM memory nodes 314 and 316 which are coupled to compute node 300 via a high speed, low latency fabric 318. In the illustrated embodiment, SCM memory 310 is coupled to a CPU 320 in SCM node 314 and SCM memory 312 is coupled to a CPU 322 in SCM node 316. FIG. 3 further shows a second or third tier of memory comprising IO (Input-Output) memory 324 implemented in a CXL (Compute Express Link) card 326 coupled to platform 300 via a CXL interconnect 328.

Under one example, Tier 1 memory comprises DDR and/or HBM, Tier 2 memory comprises 3D crosspoint memory, and T3 comprises pooled SCM memory such as 3D crosspoint memory. In some embodiments, the CPU may provide a memory controller that supports access to Tier 2 memory. In some embodiments, the Tier 2 memory may comprise memory devices employing a DIMM form factor.

Another multi-tier memory architecture is Non-Uniform Memory Architecture (NUMA). NUMA may be used in multi-socket platforms, where each socket includes local memory and a given socket can access the local memory of another socket using a socket-to-socket interconnect. NUMA platforms may also implement coherent memory across sockets.

In tiered memory systems the CPU can address memory devices with heterogenous latency and bandwidth characteristics. In the text below, "slow memory" refers to high-latency memory and low-bandwidth while "fast memory" refers to slow-latency and high-bandwidth memory. Examples of such environments include: 1) Memory pooling with local and remote memory; 2) Using a persistent memory (such as Optane PMEM) as RAM along standard DRAM; and 3) NUMA nodes.

While hyperscaler and HPC workloads can often be made NUMA-aware, this is not the case with common cloud service provider (CSP) workloads that come from third parties or are even virtualized, so tiered memory management should be generic and non-intrusive.

In the following description, "hot pages" refer to memory pages with high-access frequency by its process while "cold pages" refer to memory pages with low-access frequency by its process. Modern operating systems are made aware by the BIOS of the properties of each memory (e.g., HMAT on Linux) in order to make the best use of the resources available, generally by placing hot pages on fast memory while placing cold pages on slow memory to maximize free space in fast memory.

Optimized memory placement relies on proper hot/cold page detection. This requires sampling metadata of the processes' pages in memory. In existing methods, this is achieved by leveraging an OS kernel feature to walk the process memory page by page and run sampling code for each of them systematically. This is resource intensive. For instance, the walk might iterate over hundreds of thousands of pages or millions of pages for a large-scale system. In addition, for each page, more kernel routines are executed to collect page meta data. Moreover, the process is repeated on an ongoing basis to update the page status and meta data.

In accordance with aspects of the embodiments herein, a novel data structure is provided that keeps track of the page meta data for hot/cold page detection. Under this approach, a first sampling of the memory pages is performed by walking the memory pages using the conventional process. However, under the new approach the novel data structure is populated.

Figure 4A:
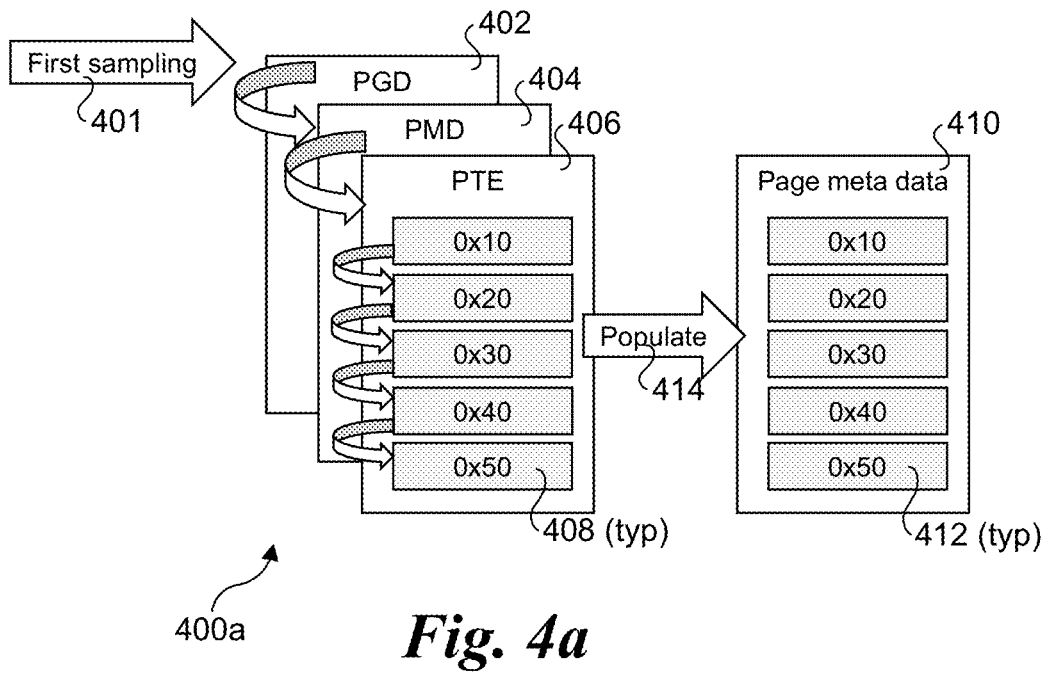
FIG. 4a is a diagram illustrating a first sampling operation during which a page walk is performed and a page meta data structure is initially populated.
Figure 4B:
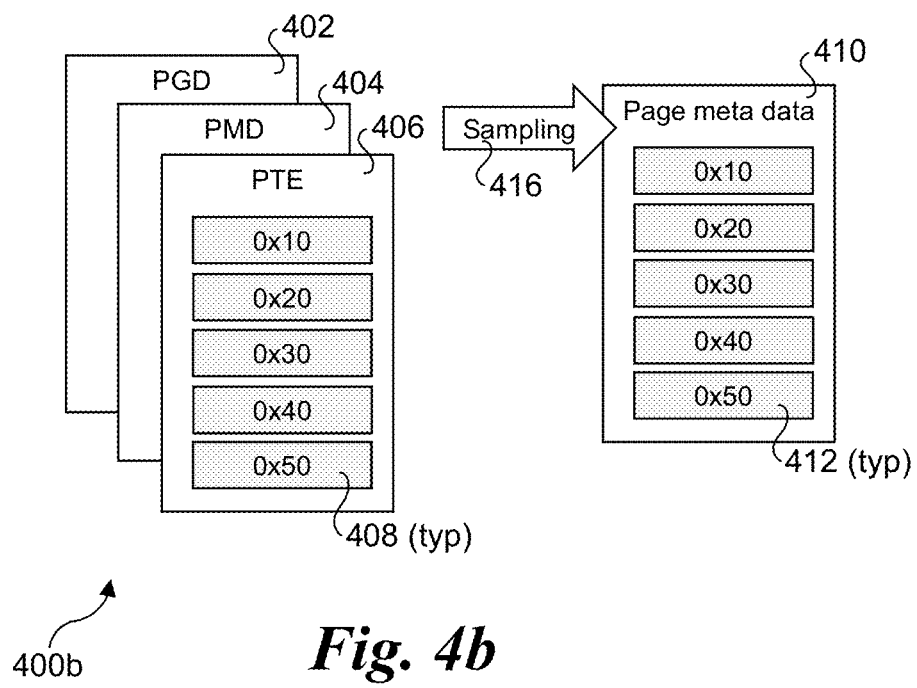
FIG. 4b is a diagram illustrating a second sampling operation during which the page meta data structure is continuously sampled.

An overview of the process applied to a non-limiting Linux implementation is illustrated in diagrams 400a and 400b in FIGS. 4a and 4b. Under Linux, page table management employs a three-level structure: a Page Global Director (PGD) table 402, Page Middle Directory (PMD) table 404, and a Page Table Entry (PTE) table 406 including multiple PTEs 408. Each process has a pointer (mm_struct→pgd) to its own PGD, which is a physical page frame. Each active entry in the PGD table points to a page frame containing an array of PMD entries of type pmd_t which in turn points to page frames containing PTE of type pte_t, which finally points to page frames containing the actual user data.

As shown in diagram 400a of FIG. 4a, during a first sampling 401, the process' entry in PGD table 402 is looked up to locate the array of PMD entries in PMD table 404 for the process. Each of the PMD table entries points to a PTE table 406, whose PTEs 408 are walked to populate a page meta data structure 410 comprising a plurality of page meta data entries 412 using populate operation 414. As shown in diagram 400b of FIG. 4b, during a second sampling 416, page meta data entries 412 in page meta data structure 410 are sampled (read) to determine whether a memory page is hot or cold.

A mechanism in the OS kernel is introduced to register a new kind of probe. These probes allow a process to register a hook on specific kernel events. In this case, the probes are configured to trigger a registered process when a page is accessed. The hook is added to a queue that is executed when possible for a given page. In one embodiment the hook is the page access event handler which queues the "needs attention" operation in a queue. The queue is then processed later (when the CPU is idle e.g.) and the page touch operation and its effect on the page hotness/coldness is processed. As this time, there is new data in the page history and the page hotness is evaluated based on the age of the page's last access synchronously.

The meta data of each page is maintained by the kernel in page meta data structure 410, which is immediately available during run-time operations according to one embodiment. Page meta data structure 410 gets updated automatically by the kernel on new page accesses (incrementally), with the page's last access time (e.g., using a timestamp) being updated.

Figures 5A, 5B, 5C:
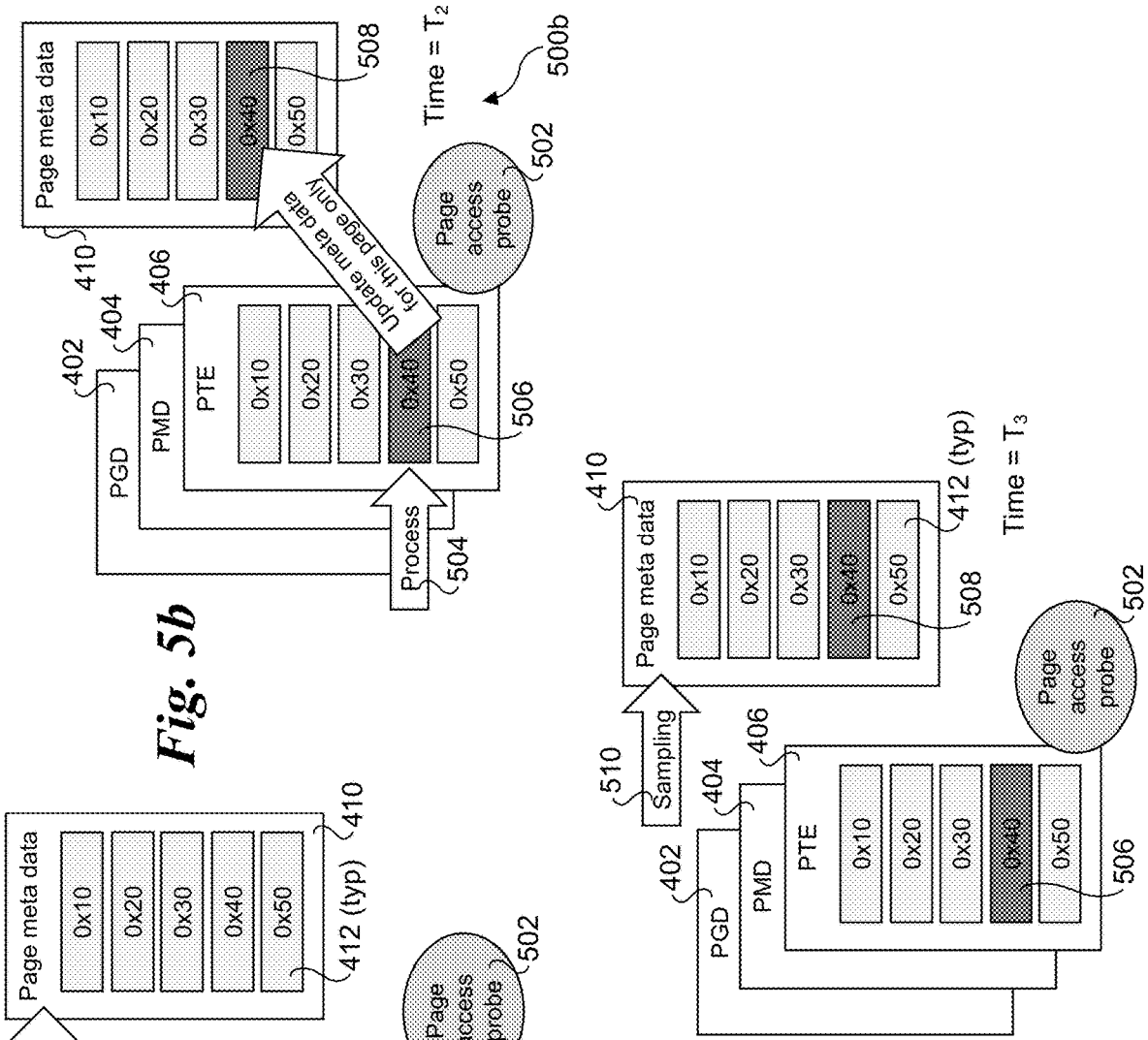
FIG. 5a is a diagram illustrating a sampling process using a page access probe during a first timeframe.
FIG. 5b is a diagram illustrating an example of the page meta data structure being updated during a second timeframe.
FIG. 5c is a diagram illustrating sampling of the updated page meta data structure during a third timeframe.

FIGS. 5*a*, 5*b*, and 5*c* shows an example implementation of the new meta data structure to identify a hot memory page. Prior to this, the full page walk and populate operation 414 shown in FIG. 4*a* will have been performed. During a first state 500*a* at time $T_1$, all pages are cold in this example. A page access probe 502 is used to sample page meta data 410 by reading the up-to-date page meta data entries 412. As page meta data entries 412 are updated when their associated memory pages are accessed, this data is up-to-date and reflects the current state of memory.

Under state 500*b* in FIG. 5*b*, a process 504 accesses a memory page 506 at time=T2. Access to the page becomes hot. Accordingly, page access probe 502 updates a page meta data entry 508 in page meta data 410 corresponding to memory page 506 with a timestamp 508. At state 500*c* corresponding to time=T3 in FIG. 5*c*, the page meta data entries 412 in page meta data 410 are sampled using a sampling process 510 implemented by page access probe 502. Sampling process 510 comprises reading the timestamps for each page meta data entry 412. Based on the timestamp value in page meta data entry 508 it is determined that memory page 506 is hot.

In one embodiment, the timestamp values for page meta data entries 412 are null or otherwise a predefined value to indicate no access to the entries' associated memory page has been entered. In another embodiment, the population operation 414 performed in conjunction with first sampling 401 in FIG. 4*a* will add a timestamp corresponding to when the population operation is performed for a given memory page.

Under the new page meta data structure and page access probe, the CPU cycles spent collecting page meta data is only the minimum required as the kernel routine for meta data collection only run for pages which have been accessed. Also, only those pages are locked rather than having to lock all pages of the process memory. This considerably reduces the sampling overhead.

Filtered Sampling

To further reduce the CPU cycles spent on sampling, in one embodiment filtering is added to the page access probe. This allows running meta data collection only for pages in memory regions of interest, as defined by a user or determined using an artificial intelligence (AI) module or the like.

Figure 6:
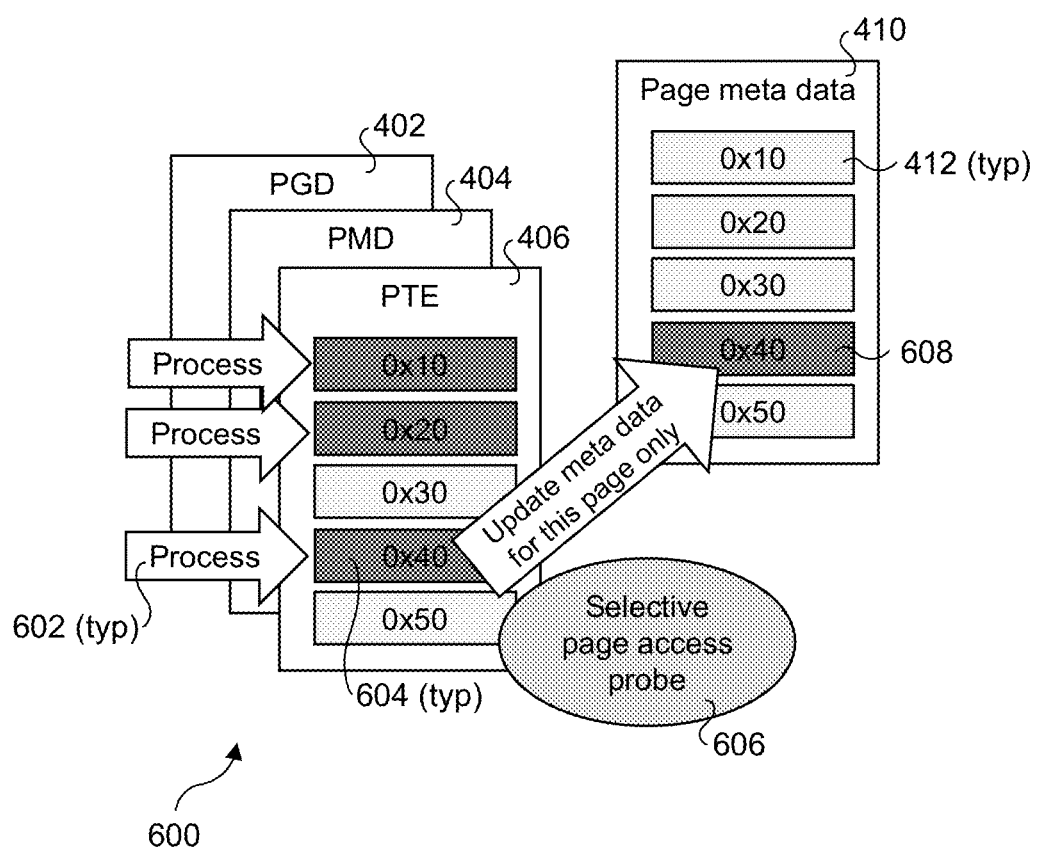
FIG. 6 is a diagram illustrating an example of filtering, according to one embodiment.

An example of filtering is shown in a diagram 600 in FIG. 6. Under this filtering example, a process 602 accesses multiple pages (three in this example) as depicted by page entries 604 in dark gray in PTE 406. A selective page access probe 606 triggers to hook for only selected pages (a page 608 in this example) among the pages 604 that are accessed by process 602. Selective page access probe 606 may access filter data associated with user-defined pages in memory regions of interest.

Trigger on Page Meta Data Updates

Under another embodiment, triggering may be implemented in response to page meta data updates. Under this approach, a new callback concept for the hot/cold page detection algorithm and any other component making use of the page meta data is implemented, such as AI models for hot/cold prediction and movement.

The execution flow is reversed compared to existing solutions: the hot/cold page detection algorithm does not poll to read current meta data, as this introduces overhead. Instead, it registers a callback which is executed upon synchronous updates on this data structure, as the events come from the workload in user space but are known by the kernel thanks to the page access hook introduced above.

Figure 7:
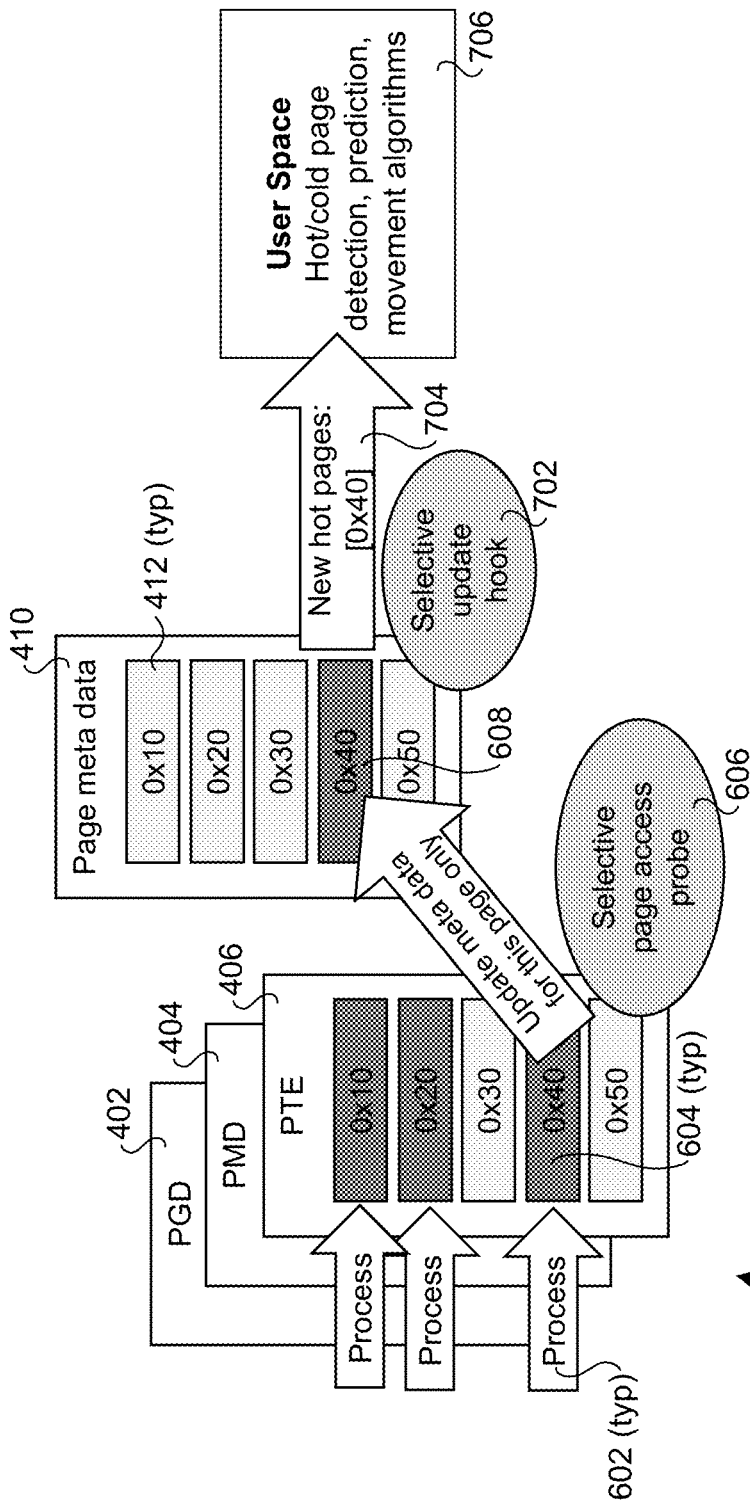
FIG. 7 is a diagram illustrating use of a selective update hook to update hot pages that are used for hot/cold page detection, prediction, and movement algorithms.

An example of this approach is illustrated in diagram 700 of FIG. 7. In addition to the components shown in FIG. 6, diagram 700 further includes a selective update hook 702, which is used to detect changes in page meta data 410 comprising new hot pages 704. The changes in page meta data 410 are used as inputs for hot/cold page detection, prediction, and movement algorithms depicted in user space 706.

This is also a place when filtering can be added to reduce the callback frequency. For example, a threshold can be set and only after the number of updated pages reached this threshold then the hook triggers the callback. Thanks to this efficiency improvement, the sampling frequency is indirectly increased which potentially leads to better hot/cold page prediction accuracy.

Another use of this execution flow is to trigger the computation of a relative page hotness score for each page synchronously based on the page history. As the method presented here significantly reduces the CPU cycles required for sampling, this frees resource for running this computation inside the OS kernel, in one embodiment.

Figure 8:
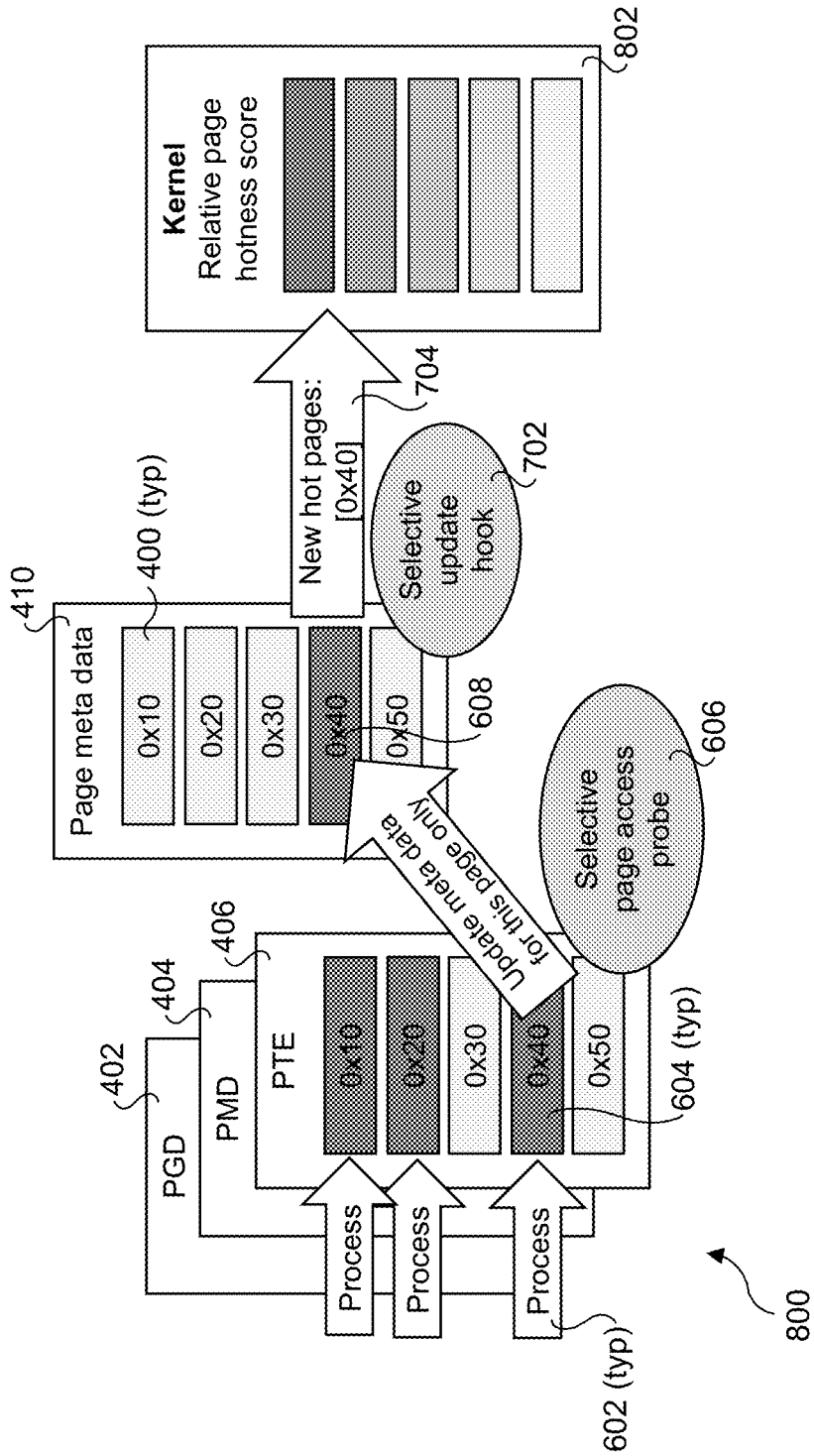
FIG. 8 is a diagram illustrating maintaining a relative page hotness data structure in kernel memory, according to one embodiment.

An example of this approach is illustrated in diagram 800 or FIG. 8. As indicated by like reference numbers in FIGS. 7 and 8, the approach is similar triggering on page meta data updates. However, under this embodiment the trigger causes the kernel to update a relative page hotness score for filtered/selected pages of interest, as depicted in a block 802.

Figure 9A:
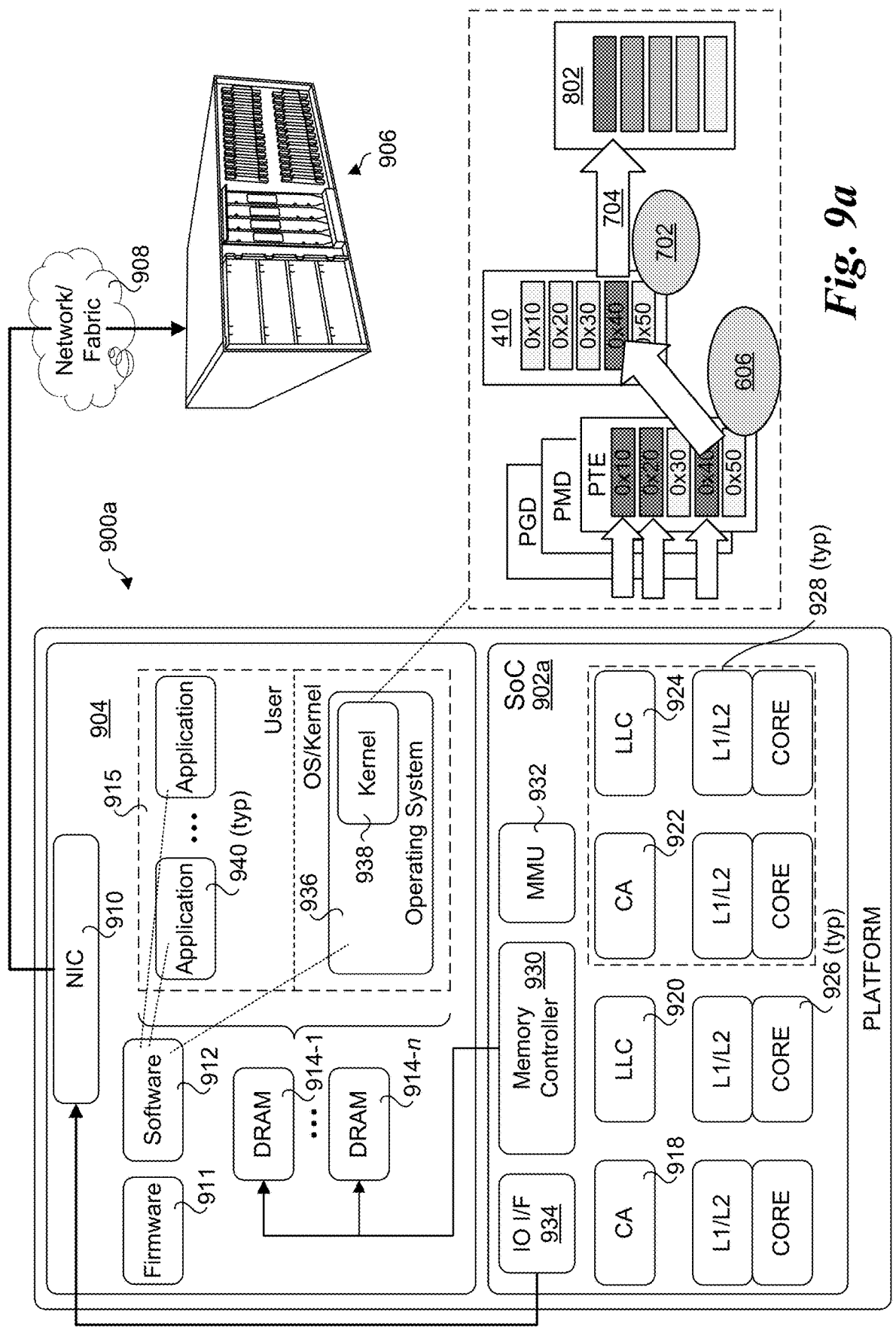
FIG. 9a is a schematic diagram illustrating a system in a disaggregated architecture under which a platform accesses remote pooled memory over a fabric, according to one embodiment.

FIG. 9*a* shows a high-level view of a system architecture according to an exemplary implementation of a system in which remote pooled memory is used in a far memory tier. The system includes a compute platform 900*a* having an SoC (aka processor or CPU) 902*a* and platform hardware 904 coupled to pooled storage 906 via a network or fabric 908. Platform hardware 904 includes a network interface controller (NIC) 910, a firmware storage device 911, a software storage device 912, and n DRAM devices 914-1 . . . 914-*n*. SoC 902*a* includes caching agents (CAs) 918 and 922, last level caches (LLCs) 920 and 924, and multiple processor cores 926 with L1/L2 caches 928. Generally, the number of cores may range from four upwards, with four shown in the figures herein for simplicity. Also, an SoC/Processor/CPU may include a single LLC and/or implement caching agents associated with each cache component in the cache hierarchy (e.g., a caching agent for each L1 cache, each L2 cache, etc.)

In some embodiments, SoC 902*a* is a multi-core processor System on a Chip with one or more integrated memory controllers, such as shown depicted by a memory controller 930. SoC 902a also includes a memory management unit (MMU) 932 and an TO interface (I/F) 934 coupled to NIC 910. In one embodiment, IO interface 934 comprises a Peripheral Component Interconnect Express (PCIe) interface.

Generally, DRAM devices 414-1 . . . 414-n are representative of any type of DRAM device, such as DRAM DIMMs and Synchronous DRAM (SDRAM) DIMMs. More generally, DRAM devices 414-1 . . . 414-n are representative of nonvolatile memory, comprising local (system) memory 915.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as SDRAM. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014), HBM (High Bandwidth Memory, JESD325, originally published by JEDEC in October 2013, LPDDR5, HBM2 (HBM version 2), or others or combinations of memory technologies, and technologies based on derivatives or extensions of such specifications. The JEDEC standards are available at wwwjedec.org.

Software storage device 912 comprises a nonvolatile storage device, which can be or include any conventional medium for storing data in a nonvolatile manner, such as one or more magnetic, solid state, or optical based disks, or a combination. Software storage device 912 holds code or instructions and data in a persistent state (i.e., the value is retained despite interruption of power to compute platform 900a). A nonvolatile storage device can be generically considered to be a "memory," although local memory 915 is usually the executing or operating memory to provide instructions to the cores on SoC 902a.

Firmware storage device 911 comprises a nonvolatile memory (NVM) device. A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Software components in software storage device 912 are loaded into local memory 915 to be executed on one or more cores 926 on SoC 902a. The software components include an operating system 936 having a kernel 938 and applications 940. The address space of local memory 915 is partitioned into an OS/kernel space in which Operating system 936 and kernel 938 are stored, and a user space in which applications 940 are stored.

The address space allocated to applications (and their processes) is a virtual address space that may be extended across multiple memory tiers, including a memory tier in remote memory pool 906. The CSP or the like may allocate portions of the memory in remote memory pool 906 to different platforms (and/or their operating systems instances). Through one or more levels of abstraction, memory space available to the applications running in local memory user space is extended to include memory on one or more far memory tiers. This virtualized memory space is accessed at the page level and in Linux is implemented using the PGD/PMD/PTE data structures described above.

Figure 9B:
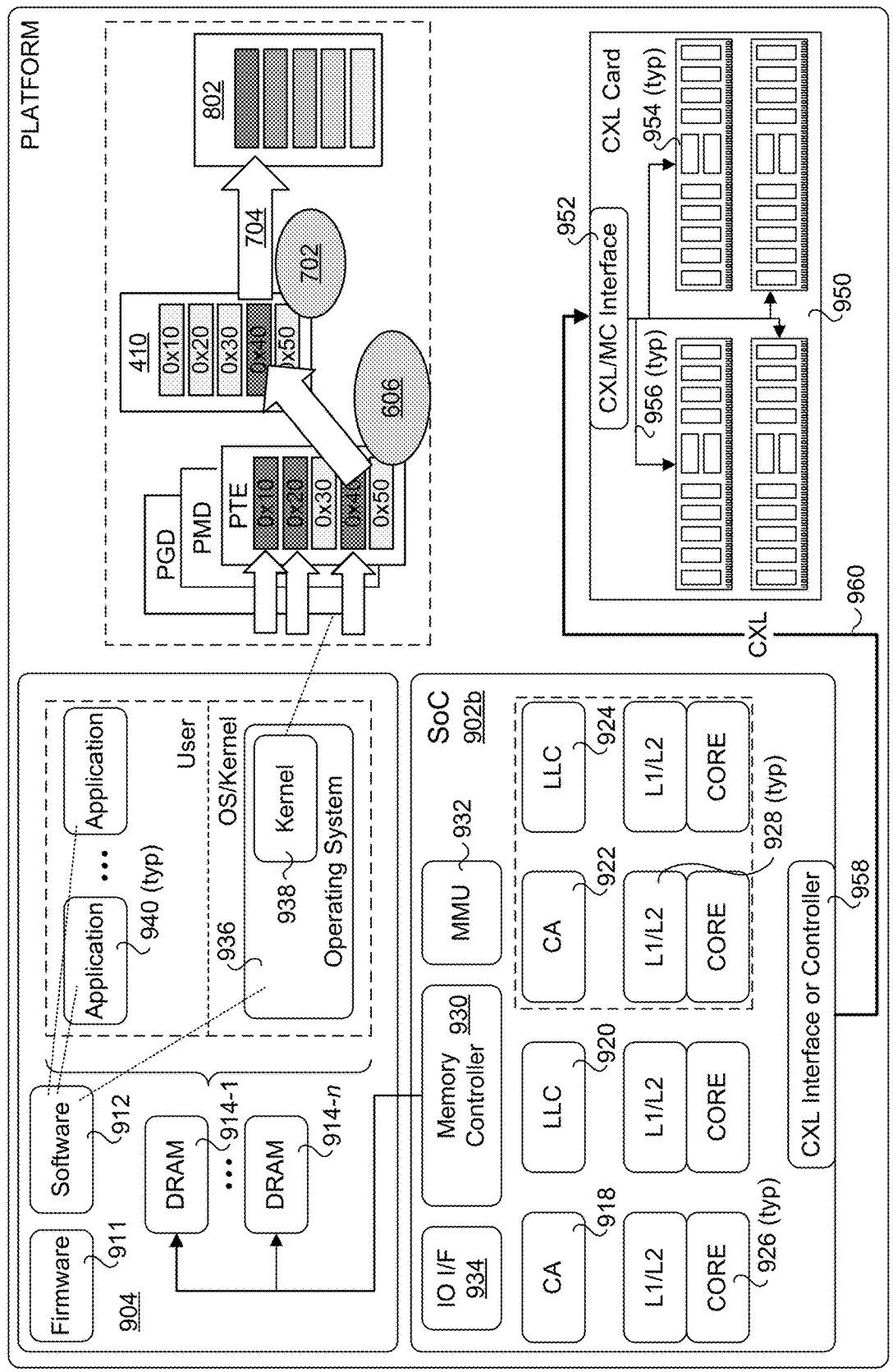
FIG. 9b is a high-level view of a system architecture including a compute platform in which a CXL memory card is implemented in a far memory tier.

FIG. 9b shows a high-level view of a system architecture including a compute platform 900b in which a CXL memory card 950 is implemented in a far memory tier. CXL card 950 includes a CXL/MC (memory controller) interface 952 and four DIMMs 954, each connected to CXL/MC interface 952 via a respective memory channel 956. CXL/MX interface 952 is connected to a CXL interface or controller 958 on an SoC 902b via a CXL link 960, also referred to as a CXL flex-bus.

The labeling of CXL interface or controller 958 and CXL/MC interface 952 is representative of two different configurations. In one embodiment, CXL interface or controller 958 is a CXL interface and CXL/MX interface 952 is a CXL interface with a memory controller. Alternatively, the memory controller may be coupled to the CXL interface. In another embodiment, CXL interface or controller 958 comprises a CXL controller in which the memory controller functionality is implemented, and CXL/MX interface 952 comprises a CXL interface. It is noted that memory channels 956 may represent a shared memory channel implemented as a bus to which DIMMs 954 are coupled.

Generally, DIMMs 954 may comprising DRAM DIMMs or hybrid DIMMS (e.g., 3D crosspoint DIMMs). In some embodiments, a CXL card may include a combination of DRAM DIMMs and hybrid DIMMs. In yet another alternative, all or a portion of DIMMs 954 may comprise NVDIMMs.

Figure 10:
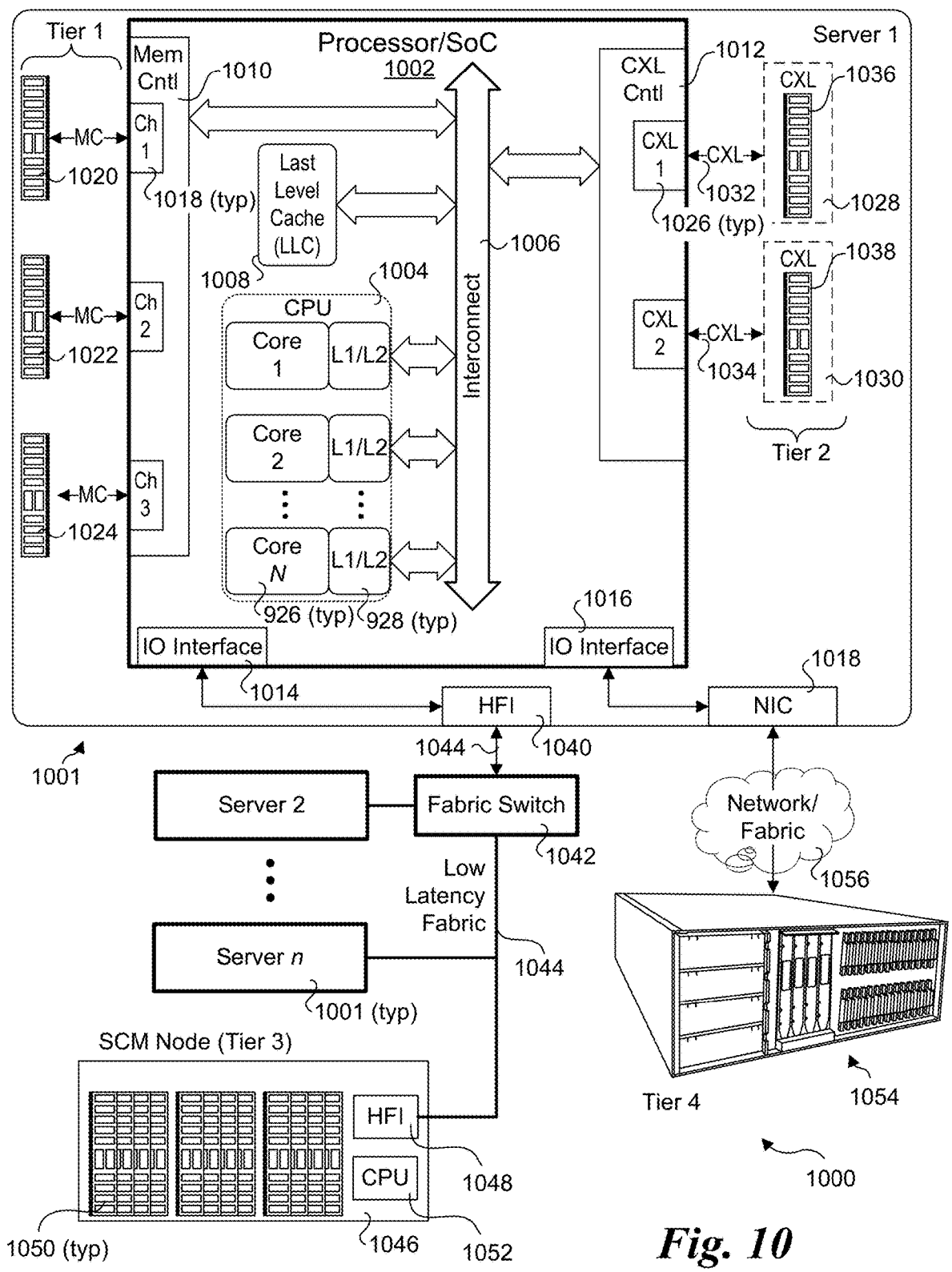
FIG. 10 is a schematic diagram of an cloud environment in which four tiers of memory are implemented.

As shown in FIG. 10 and discussed below, in some embodiments CXL DIMMs may be used that are coupled to a CLX controller on an SoC/Processor/CPU via a CXL DIMM socket or the like. In this instance, the CXL DIMMs are not installed in a CXL card.

FIG. 10 shows a cloud environment 1000 in which four memory tiers are implement. Cloud environment 1000 includes multiple compute platforms comprising servers 1001 that are also referred as servers 1-n. Server 1001 includes a processor/SoC 1002 including a CPU 1004 having N cores 926, each with an associated L1/L2 cache 928. The cores/L1/L2 caches are coupled to an interconnect 1006 to which an LLC 1008 is coupled. Also coupled to interconnect 1006 is a memory controller 1010, a CXL controller 1012, and IO interfaces 1114 and 1016. Interconnect 1006 is representative of an interconnect hierarchy that includes one or more layers that are not shown for simplicity.

Memory controller 1010 includes three memory channels 1018, each connected to a respective DRAM or SDRAM DIMM 1020, 1022, and 1024. CXL controller 1012 includes two CXL interfaces 1026 connected to respective CXL memory devices 1028 and 1030 via respective CXL flex-busses 1032 and 1034. CXL memory devices 1028 and 1030 include DIMMs 1036 and 1038, which may comprise CXL DIMMs or may be implemented on respective CXL cards and comprising any of the memory technologies described above.

IO interface 1114 is coupled to a host fabric interface (HFI) 1040, which in turn is coupled to a fabric switch 1042 via a fabric link in a low-latency fabric 1044. Also coupled to fabric switch 1042 are server 2 . . . server n and an SCM node 1046. SCM node 1046 includes an HFI 1048, a plurality of SCM DIMMs 1050, and a CPU 1052. Generally, SCM DIMMs may comprise NVDIMMs or may comprise a combination of DRAM DIMMs and NVDIMMs. In one embodiment, SCM DIMMs comprise 3D crosspoint DIMMs.

IO interface 1016 is coupled to a NIC 1018 that is coupled to a remote memory pool 1054 via a network/fabric 1056. Generally, remote memory pool 1054 will employ DIMMs that are SCM DIMMs.

As further shown, DRAM/SDRAM DIMMs 1020, 1022, and 1024 are implemented in memory tier 1 (also referred to herein as local memory or near memory), while CXL devices 1028 and 1030 are implemented in memory tier 2. Meanwhile, SCM node 1046 is implemented in memory tier 3, and remote pooled memory 1054 is implemented in memory tier 4. In this example, the memory tiers are ordered by their respective latencies, wherein tier 1 has the lowest latency and tier 4 has the highest latency.

It will be understood that not all of cloud environment 1000 may be implemented, and that one or more of memory tiers 2, 3, and 4 will be used. In other words, a cloud environment may employ one local or near memory tier, and one or more far memory tiers.

As with remote memory pool 1054, the memory resources of an SCM node may be allocated to different servers 1001 and/or operating system instances running on servers 1001. Moreover, a memory node may comprise a chassis, drawer, or sled including multiple SCM cards on which SCM DIMMs are installed.

Figure 11:
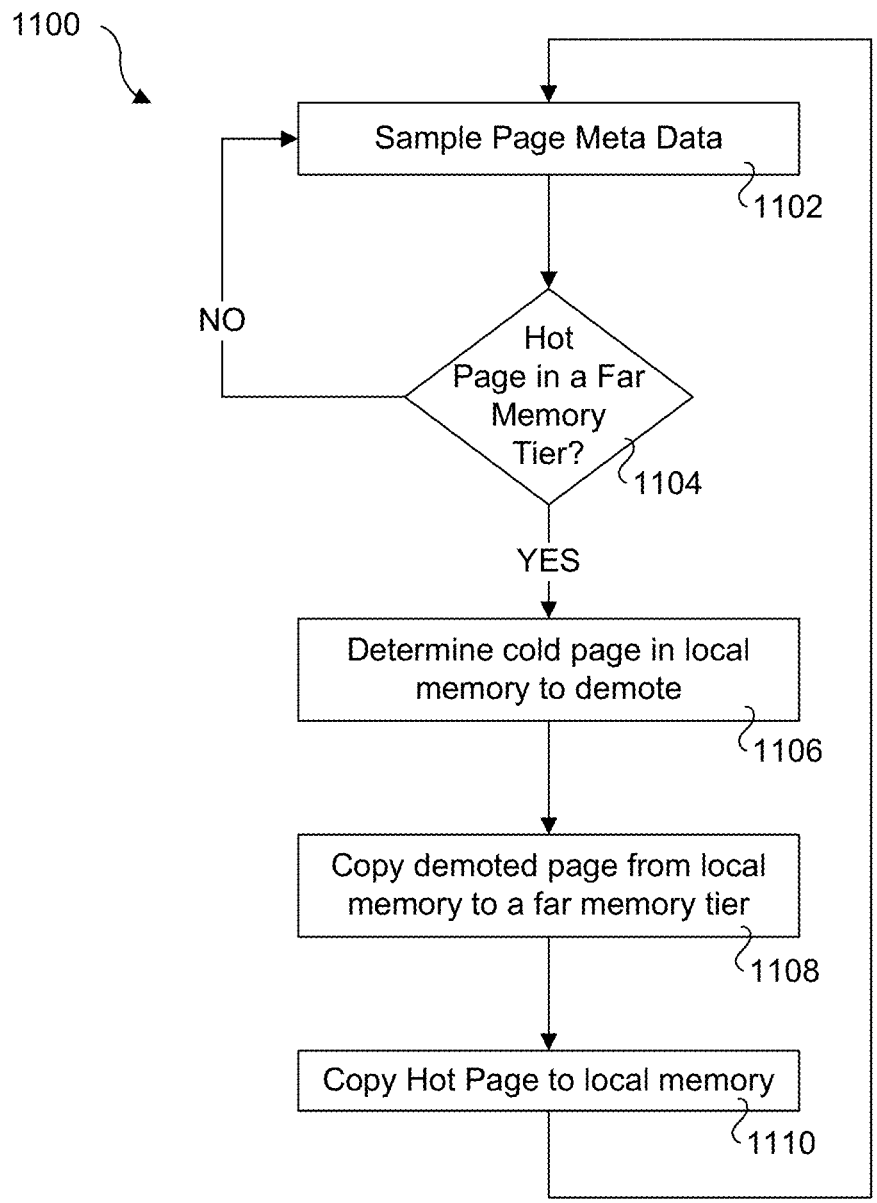
FIG. 11 is a flowchart illustrating operations and logic performed by an operating system during ongoing run-time operations, according to one embodiment.

FIG. 11 shows a flowchart 1100 illustrating operations and logic performed by an operating system during ongoing run-time operations. These operations are performed in parallel with the other run-time operations discussed above (continuous updating of the page meta data). In a block 1102, the page meta data in the page meta data structure are sampled. As describe above, various types of filters may be used, and different application/processes may employ one or more different filters.

In a decision block 1104, a determination is made to whether a hot page in a far memory tier is detected. Different mechanisms may be used to determine whether a page is hot, such as describe above. Under some embodiments, different criteria may be used to determine whether a page crosses a hot/cold threshold depending on characteristics of the memory tier the page is in. For example, since the latency "cost" of accessing a memory page for a memory tier that is farther away is higher than the latency cost of accessing a memory page in a nearer memory tier, the hot/cold threshold for a high-latency page, such as in remote pooled memory may be lower than the hot/cold threshold for a page in an CXL memory tier.

If the determination to decision block 1104 is NO, the logic loops back to block 1102 to perform the next sample. If the answer to decision block 1102 is YES, the logic proceeds to a block 1106 in which a cold page is local (near) memory is selected for demotion. Various mechanisms may be used to determine which page to demote, such as a least recently used page. Generally, the page demotion logic may be similar to logic used for cache evictions, except in this case the unit of data that is being demoted/evicted is a memory page rather than a cache line.

In connection with determining which cold page in local memory to demote, that page is copied to a far memory tier, as depicted in a block 1108. Depending on how many levels of memory tiers are implemented and/or other considerations, a demoted page may be copied to a next nearest memory tier or it might be swapped to the memory tier the hot page is in. In cases where there is room in local memory there would be no need to demote a memory page and the operations in blocks 1106 and 1108 may be skipped.

Once a space in local memory is freed (or if room already existed), the hot page is copied to local memory in a block 1110. The continuous process then loops back to block 1102 to resample the page meta data.

Variations on the process illustrated in flowchart 1110 may be implemented. For example, in some embodiments hot pages may be identified in conjunction with updates to the page meta data such that sampling is not used. This would enable hot pages to immediately be identified and copied to local memory. This, again, may consider a hot/cold threshold. For instance, a hot page in a farthest memory tier might be immediately copied into local memory, while a hot page in a nearer memory tier, such as a CXL tier might not be immediately copied.

Another consideration is the type of data transfers supported by the applicable protocol. For instance, CXL memory supports memory access at a cacheline granularity. Conversely, memory that is accessed over a network or fabric will transfer the data in packets. In many cases, it may be more effective to transfer data at the block level (e.g., page level) rather than only transfer the requested data (in instances where a given data structure to be accessed is smaller than a block/page).

During the looping and sampling operations of flowchart 1110, multiple hot pages may be identified for a given loop. In this case, the logic may be applied to the multiple hot pages concurrently (in the same loop).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A;B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented with a compute platform configured to access memory pages in a plurality of memory tiers including a near memory tier comprising local memory coupled to a processor in the compute platform and at least one far memory tier, comprising:
   populating a page meta data structure with meta data associated with memory pages in the plurality of memory tiers;
   in conjunction with one or more processes executing on the processor accessing memory pages, filtering, for each of at least one of the one or more processes, updating of page meta data for one or more selected memory pages accessed by that process, the filtering resulting in updating of page meta data for less than all the memory pages accessed by the process;

updating the page meta data structure to reflect accesses to memory pages including memory pages that are filtered; and using the page meta data to determine which pages are hot pages and which pages are cold pages, wherein hot pages are memory pages with relatively higher access frequencies and cold pages are memory pages with relatively lower access frequencies.

2. The method of claim 1, further comprising:

detecting a memory page in a far memory tier is a hot memory page;

detecting a memory page in the near memory tier is a cold memory page; and copying the hot memory page into the near memory tier.

3. The method of claim 1, wherein the page meta data structure is initially populated by performing operations comprising:

performing a page walk of memory pages in the far memory tier;

performing sampling of the memory pages as they are walked;

generating page meta data from the sampling; and populating the page meta data structure with the page meta data that are generated.

4. The method of claim 1, further comprising:

registering a hook in an operating system kernel to trigger a registered process associated with a kernel event comprising accessing a memory page; and using the registered process to update page meta data for the page when the kernel event is triggered.

5. The method of claim 1, further comprising:

enabling pages in one or more memory regions of interest to be defined for filtering; and performing filtering on the page meta data updates, wherein page meta data are updated for memory page accesses to the pages defined for filtering, while page meta data are not updated for memory page accesses to pages that are not defined for filtering.

6. The method of claim 1, further comprising:

registering a callback function to be called when an update is made to at least a portion of the page meta data in the page meta data structure; and executing the callback function upon synchronous updates to the page meta data structure.

7. The method of claim 6, further comprising implementing a filter on the callback function, the filter having a trigger based on a predetermined condition, wherein the callback function is called when the filter is triggered.

8. The method of claim 1, wherein the plurality of memory tiers includes a far memory tier comprising memory that is accessed over a Compute Express Link (CXL) link or a flex-bus link.

9. The method of claim 1, wherein the plurality of memory tiers includes a far memory tier comprising a remote memory pool.

10. A compute platform comprising:

a System on a Chip (SoC) including a central processing unit (CPU) having one or more cores on which software is executed including an operating system having a kernel and one or more processes associated with applications;

local memory coupled to the SoC comprising a near memory tier; and at least one input-output (IO) interface configured to be coupled to memory in a far memory tier;

wherein execution of the software enables the compute platform to:

populate a page meta data structure with meta data associated with memory pages in the near memory tier and far memory tier;

in conjunction with one or more of the processes accessing memory pages in near and far memory tiers, filter, for each of at least one of the one or more processes, updating of page meta data for one or more selected memory pages accessed by that process, the filtering resulting in updating of page meta data for less than all the memory pages accessed by the process;

update the page meta data structure to reflect accesses to memory pages including memory pages that are filtered; and employ the page meta data to determine which pages are hot pages and which pages are cold pages, wherein hot pages are memory pages with relatively higher access frequencies and cold pages are memory pages with relatively lower access frequencies.

11. The compute platform of claim 10, wherein execution of the software further enables the compute platform to:

detect a memory page in a far memory tier is a hot memory page;

detecting a memory page in the near memory tier is a cold memory page; and copy the hot memory page into the near memory tier.

12. The compute platform of claim 10, wherein execution of the software further enables the compute platform to:

register a hook in the operating system kernel to trigger a registered process associated with a kernel event comprising accessing a memory page; and use the registered process to update page meta for the memory page when the kernel event is triggered.

13. The compute platform of claim 10, wherein execution of the software further enables the compute platform to:

enable pages in one or more memory regions of interest to be defined for filtering; and perform filtering on the page meta data updates, wherein page meta data are updated for memory page accesses to the pages defined for filtering, while page meta data are not updated for memory page accesses to pages that are not defined for filtering.

14. The compute platform of claim 10, wherein execution of the software further enables the compute platform to:

register a callback function to be called when an update is made to at least a portion of the page meta data in the page meta data structure; and execute the callback function upon synchronous updates to the page meta data structure.

15. The compute platform of claim 10, further comprising a Compute Express Link (CXL) interface or CXL controller coupled to a CXL memory card or at least one CXL Dual Inline Memory Module (DIMM).

16. A non-transitory machine-readable storage medium having instructions comprising an operating system including a kernel stored thereon, the operating system configured to be run on a compute platform via execution of the instructions on a processor of the compute platform, the processor coupled to local memory comprising near memory, the compute platform including or providing access to one or more tiers of far memory, wherein execution of the instructions enables the operating system to:

populate a page meta data structure with meta data associated with memory pages in the remote memory pool;

in conjunction with one or more processes executing on the processor accessing memory pages in a far memory tier, filter, for each of at least one of the one or more processes, updating of meta data for one or more selected memory pages in the far memory tier accessed by that process, the filtering resulting in updating of meta data for less than all the memory pages accessed by the process;

update the page meta data structure to reflect accesses to memory pages including memory pages that are filtered; and employ the page meta data to determine which pages are hot pages and which pages are cold pages, wherein hot pages are memory pages with relatively higher access frequencies and cold pages are memory pages with relatively lower access frequencies.

17. The non-transitory machine-readable storage medium of claim 16, wherein execution of the instructions further enables the operating system to copy hot pages of memory in the far memory tier to the local memory.

18. The non-transitory machine-readable storage medium of claim 16, wherein execution of the instructions further enables the operating system to register a hook in the operating system kernel to trigger a registered process associated with a kernel event comprising accessing a memory page; and use the registered process to update page meta for the memory page when the kernel event is triggered.

19. The non-transitory machine-readable storage medium of claim 16, wherein execution of the instructions further enables the operating system to:

enable pages in one or more memory regions of interest to be defined for filtering; and perform filtering on the page meta data updates, wherein page meta data are updated for memory page accesses to the pages defined for filtering, while page meta data are not updated for memory page accesses to pages that are not defined for filtering.

20. The non-transitory machine-readable storage medium of claim 16, wherein execution of the instructions further enables the operating system to:

register a callback function to be called when an update is made to at least a portion of the page meta data in the page meta data structure; and execute the callback function upon synchronous updates to the page meta data structure.

\* \* \* \* \*